(12) United States Patent
Joyce (10) Patent No.: US 9,452,512 B2
(45) Date of Patent: Sep. 27, 2016

(54) METHOD FOR REPOSITIONING A CUTTERBAR ASSEMBLY OF HEADER OF AN AGRICULTURAL HARVESTER

(71) Applicant: CNH Industrial America LLC, New Holland, PA (US)

(72) Inventor: Joshua Steward Joyce, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 70 days.

(21) Appl. No.: 14/272,605

(22) Filed: May 8, 2014

(65) Prior Publication Data

US 2015/0319920 A1    Nov. 12, 2015

(51) Int. Cl.
| | |
|---|---|
| A01D 43/00 | (2006.01) |
| A01D 43/06 | (2006.01) |
| B25B 13/48 | (2006.01) |
| A01D 34/28 | (2006.01) |
| A01D 34/40 | (2006.01) |

(52) U.S. Cl.
CPC ............. *B25B 13/48* (2013.01); *A01D 34/283* (2013.01); *A01D 34/40* (2013.01); *B25B 13/481* (2013.01)

(58) Field of Classification Search
CPC .. A01B 61/046; A01D 41/14; A01D 41/141; A01D 89/004
USPC .......................................... 56/208, 158, 153
See application file for complete search history.

(56) References Cited

U.S. PATENT DOCUMENTS

| | | |
|---|---|---|
| 501,865 A | 7/1893 | Brewster |
| 995,398 A | 6/1911 | Benjamin et al. |
| 1,164,713 A | 12/1915 | Grieves |
| 2,414,958 A | 1/1947 | Lohse |
| 3,088,264 A * | 5/1963 | Sallee .................. A01D 41/141 137/596.12 |
| 3,163,974 A * | 1/1965 | Mack ................... A01D 41/141 56/10.2 E |
| 3,489,428 A * | 1/1970 | Hunter .................. B60S 1/0411 280/765.1 |
| 3,641,747 A * | 2/1972 | Bobard .................. A01D 41/04 56/15.6 |
| 3,665,688 A * | 5/1972 | Sheehan ................ A01D 41/14 56/14.6 |
| 3,808,784 A * | 5/1974 | Gardner ................ A01D 41/12 56/208 |
| 3,886,718 A * | 6/1975 | Talbot .................. A01D 41/141 56/10.2 E |
| 4,030,274 A * | 6/1977 | Reber ................... A01D 89/004 56/13.5 |
| 4,136,508 A * | 1/1979 | Coleman .............. A01D 41/141 56/10.2 E |
| 4,206,584 A * | 6/1980 | Johnson ................ A01D 41/14 56/15.8 |

(Continued)

FOREIGN PATENT DOCUMENTS

| | | |
|---|---|---|
| EP | 1348520 A1 | 10/2003 |
| GB | 617548 A | 2/1949 |

*Primary Examiner* — Árpád Fábián-Kovács
(74) *Attorney, Agent, or Firm* — Peter K. Zacharias; Patrick M. Sheldrake (57) ABSTRACT

A method for repositioning a cutterbar assembly of a header of an agricultural harvester. The header includes a chassis. The cutterbar assembly includes a cutterbar and a supporting arm. The method includes steps of connecting one end of the supporting arm to the chassis, further connecting the supporting arm to the chassis via a down-stop linkage assembly positionable between first and second positions, engaging a lockout tool with the down-stop linkage assembly, applying a torque to the down-stop linkage assembly via the lockout tool, and repositioning the down-stop linkage assembly from either the first position or the second position upon application of the torque. An opposite end of the supporting arm is connected to the cutterbar. In the first position, the cutterbar is positioned distal to a front end of the chassis, and in the second position, the cutterbar is positioned proximal to the front end of the chassis.

20 Claims, 7 Drawing Sheets

(56) References Cited

U.S. PATENT DOCUMENTS

| | | | | |
|---|---|---|---|---|
| 4,211,057 A * | 7/1980 | Dougherty | ............ | A01D 41/141 56/10.2 E |
| 4,315,395 A * | 2/1982 | Randall | .................. | A01D 41/14 280/765.1 |
| 4,435,946 A * | 3/1984 | Erickson | ................ | A01D 57/22 56/15.6 |
| 4,564,991 A | 1/1986 | Taylor | | |
| 4,573,308 A * | 3/1986 | Ehrecke | ................ | A01D 41/14 56/14.4 |
| 4,599,852 A * | 7/1986 | Kerber | ................... | A01D 41/14 56/15.8 |
| 5,090,184 A * | 2/1992 | Garter | ................... | A01D 46/08 56/10.2 E |
| 5,115,628 A * | 5/1992 | Garter | ................... | A01D 46/08 56/10.2 E |
| 6,289,659 B1 * | 9/2001 | Fox | ........................ | A01D 46/08 56/10.2 E |
| 6,530,197 B1 * | 3/2003 | Christensen | ......... | A01D 41/141 172/4 |
| 6,588,187 B2 * | 7/2003 | Engelstad | .............. | A01D 46/08 56/10.2 E |
| 7,111,444 B1 | 9/2006 | Morris et al. | | |
| 7,553,225 B2 | 6/2009 | Benes | | |
| 8,151,547 B2 | 4/2012 | Bich et al. | | |
| 2006/0242935 A1 * | 11/2006 | Rayfield | ............... | A01D 41/141 56/10.2 E |
| 2008/0264025 A1 * | 10/2008 | Ditchcreek | ......... | A01D 41/141 56/10.2 E |
| 2010/0077712 A1 * | 4/2010 | Nathan | ................ | A01D 41/141 56/10.2 E |
| 2010/0083629 A1 * | 4/2010 | Klotzbach | ............ | A01D 41/14 56/320.1 |
| 2011/0271653 A1 * | 11/2011 | Vandeven | ........... | A01D 41/141 56/10.2 E |

* cited by examiner

METHOD FOR REPOSITIONING A CUTTERBAR ASSEMBLY OF HEADER OF AN AGRICULTURAL HARVESTER

BACKGROUND

The subject application relates generally to headers for agricultural harvesters. In particular, the subject application relates to a cutterbar lockout tool, a header including such tool and a method for repositioning a cutterbar assembly using such tool.

Agricultural harvesters such as combine harvesters are well known apparatuses for harvesting grain crops. An agricultural harvester is typically a self-propelled vehicle which includes a feederhouse and mechanisms downstream of the feederhouse for separating grain from other crop material. A header is attached to the front of the harvester and includes mechanisms for cutting crop, gathering crop and delivering crop to the harvester's feederhouse. A typical crop cutter or cutterbar includes a stationary knife and a reciprocating knife which together act as shears that cut crop near the ground. After cutting, the crop is gathered, e.g., by a harvesting reel which feeds the cut crop to a conveyor system that transports the cut crop to the harvester's feederhouse.

Certain header constructions include skid plates or skid shoes that extend the width of the header which are operable to contact the ground surface as the combine travels over a field being harvested. The skid shoes are carried at the fore or distal ends of a plurality of independently movable and spaced apart flex or supporting arms and the crop cutter or cutterbar is carried at the leading edge of the skid shoes. The supporting arms are pivotably attached at their aft or proximal ends to the header chassis or frame and downward movement of the supporting arms in relation to the header chassis is limited by down-stop linkages. The down-stop linkages are typically pivotally connected at one end to the header chassis and slidably and/or pivotally connected at their opposite ends to the supporting arms. In such header designs, the down-stop linkages are employed to lock and unlock the supporting arms and thus the cutterbar at predetermined positions with respect to the header chassis. In the unlocked state, the supporting arms are able to pivot upwardly and downwardly as dictated by changes in ground contour experienced by the skid shoes. Consequently, the cutterbar floats near the ground during harvesting which is beneficial when harvesting low-lying crops including but not limited to soybeans.

In such header designs including down-stop linkages, it is often desirable or necessary to secure or lock the supporting arms and the cutterbar in an upward stationary position with respect to the header chassis in order to effectively harvest standing crops including but not limited to wheat and barley. It is also common to lock the supporting arms with respect to the header chassis to prevent bouncing of the cutterbar during transport of the header between fields or portions of fields to be harvested. In operation, the locking and unlocking of the supporting arms can occur multiple times in a season if not multiple times a week or even more frequently.

Locking and unlocking of conventional header supporting arms is a time-consuming and laborious task. When locking the supporting arms, the combine operator or other worker must physically lift each of the supporting arms and secure the supporting arm to the header chassis by inserting a fastener such as a locking pin into cooperating apertures provided in the down-stop linkage and a corresponding header chassis member. Because of the interconnection of the supporting arms, the skid shoes and the cutterbar, lifting of one supporting arm will cause the adjacent arms to rise somewhat. Hence, the person lifting one supporting arm will also at least partially lift the supporting arms to the right and left of the supporting arm being lifted. Additionally, the accumulation of dirt and/or crop material can make the supporting arms more difficult to lift. As a result, the force required to lift a typical header supporting arm can be considerable and may be beyond the physical capabilities of ordinary persons. Accordingly, a worker who experiences difficulty with or is incapable of lifting a supporting arm and inserting the locking fastener may need to rely upon the assistance of another person.

BRIEF SUMMARY

In accordance with a first aspect, the subject application provides a method for repositioning a cutterbar assembly of a header of an agricultural harvester. The header includes a chassis and the cutterbar assembly extends from the chassis. The cutterbar assembly includes a supporting arm having one end pivotably connected to the chassis and an opposite end connected to a cutter bar. The method includes the act of connecting the supporting arm to the chassis about a mid-region of the supporting arm with a down-stop linkage assembly positionable between first and second positions. In the first position the cutterbar is positioned proximal to a front end of the chassis and in the second position the cutterbar is positioned distal to the front end of the chassis. The method further includes the acts of receiving a lockout tool engageable with the down-stop linkage assembly for applying a torque to the down-stop linkage assembly and repositioning the down-stop linkage assembly from either the first position or the second position upon application of the torque.

In accordance with a second aspect, the subject application provides a cutterbar lockout tool for a cutterbar assembly of a header of an agricultural harvester. The tool includes an engaging portion engageable with a down-stop linkage assembly of the cutterbar assembly and an elongated body extending from the engaging portion.

In accordance with a third aspect, the subject application provides a header for an agricultural harvester including a chassis, a cutterbar assembly, a down-stop linkage assembly and a lockout tool. The cutterbar assembly extends from the chassis and includes a cutterbar and a supporting arm having one end pivotably connected to the chassis and an opposite end connected to the cutterbar. The down-stop linkage assembly connects the supporting arm to the header chassis about a mid-section of the supporting arm and includes an engaging member. The lockout tool includes an engaging portion configured to engage a portion of the down-stop linkage assembly and an elongated body. The down-stop linkage and engaged lockout tool produces a mechanical advantage of at least about 4:1 for moving the cutterbar assembly.

In accordance with a fourth aspect, the subject application provides a tool for locking and unlocking the cutterbar of a header of an agricultural harvester with minimal labor and time. The tool is compact in size, manipulable by one person and can be carried by the header. The tool slides over the down-stop linkage of the cutterbar supporting arm and the user applies torque-inducing force to the tool. By application of the torque, force is transferred through the down-stop linkage to the supporting arm via e.g., a cross pin. Significant mechanical advantage achieved by the tool allows the operator to easily raise the cutterbar with one hand and insert or remove a locking pin with the other hand. As a consequence, one person can lock and unlock the cutterbar with little to moderate difficulty and in a short period of time, thereby eliminating the need for assistance from other persons or use of cumbersome lifting equipment.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
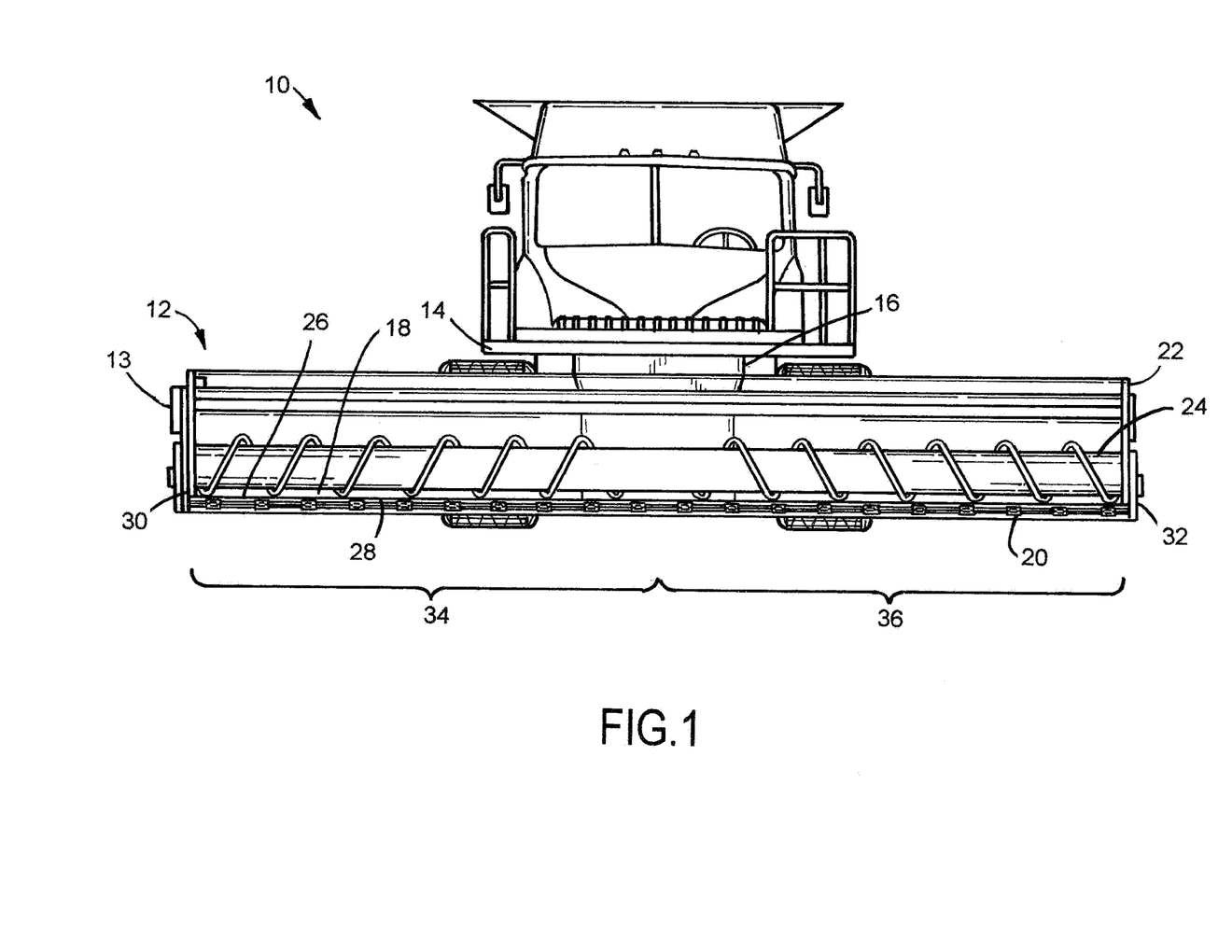
FIG. 1 is a front elevation view of a conventional agricultural harvester including a header.

Referring now to the drawings, wherein aspects of the subject application are shown, FIG. 1 illustrates an agricultural harvester 10 such as a combine. Harvester 10 includes a header 12 including a chassis or frame 13 which is attached to a forward end 14 of the harvester. Header 12 is configured to cut crops and to induct the cut crops into a feederhouse 16 as harvester 10 moves forward over a crop field.

Header 12 further includes a floor 18 that is supported in desired proximity to the surface of a crop field and an elongate sickle or cutterbar 20 that extends transversely along a forward edge of the floor 18. Cutterbar 20 is configured to cut crops in preparation for induction into the feederhouse 16. Additionally, header 12 includes an elongate, transversely extending harvesting reel 22 disposed above cutterbar 20. Harvesting reel 22 is rotatable in a direction suitable for facilitating the induction of cut crops into feederhouse 16. Header 12 further includes an elongate, rotatable auger 24 which extends in close proximity to a top surface 26 of floor 18. Auger 24 is configured to cooperate with harvesting reel 22 in conveying cut crops to feederhouse 16, which is configured to convey the cut crops into harvester 10 for threshing and cleaning. While FIG. 1 illustrates a header including an auger conveyor system, it will be understood that the header may alternatively be configured to include a draper conveyor system or any combination of auger, draper or other conveyor system that may be suitable for conveying cut crop material to feederhouse 16.

Cutterbar 20 extends along a forward edge 28 of floor 18, and generally is bounded by a first side edge 30 and an opposing second side edge 32 of floor 18. Cutterbar 20 can be configured to include a first reciprocating knife assembly 34 and a second reciprocating knife assembly 36 (along with an unillustrated stationary knife) The reciprocating mechanisms of such knife assemblies are known in the art and a further detailed description of their structure, function and operation is not necessary for a complete understanding of the subject application. However, a typical reciprocating mechanism applicable to the knife assembly of the subject application is disclosed in U.S. Pat. No. 8,151,547, the entire disclosure of which is incorporated by reference herein.

Figure 2:
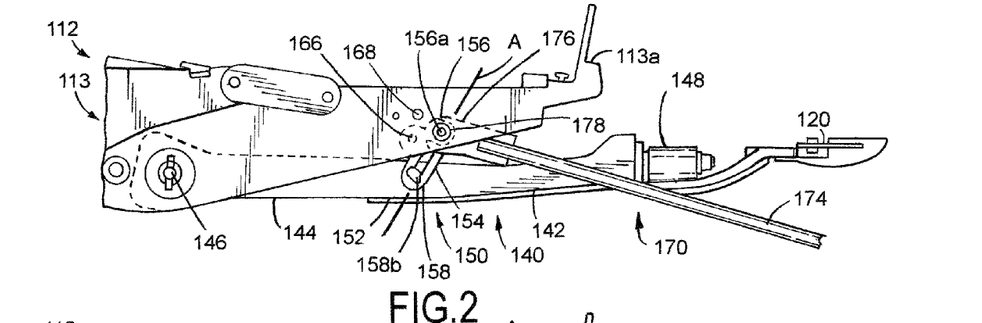
FIG. 2 is a partial side view of a header chassis and a cutterbar lockout tool according to an aspect of the subject application with a cutterbar assembly in a distal position with respect to the header chassis.
Figure 3:
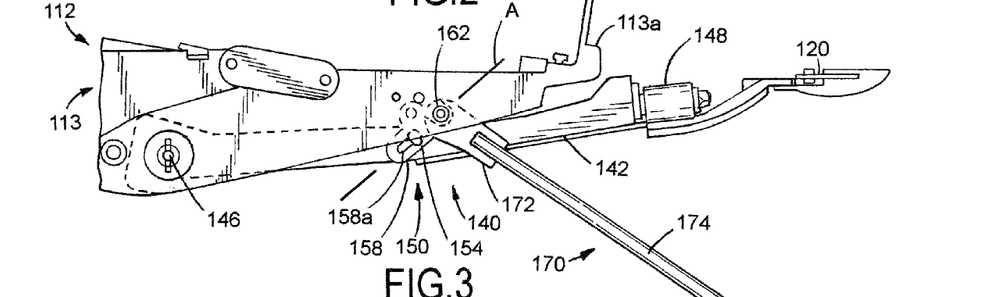
FIG. 3 is a partial side view of the header chassis and the cutterbar lockout tool of FIG. 2 with the cutterbar assembly in an intermediate position with respect to the header chassis.
Figure 4:
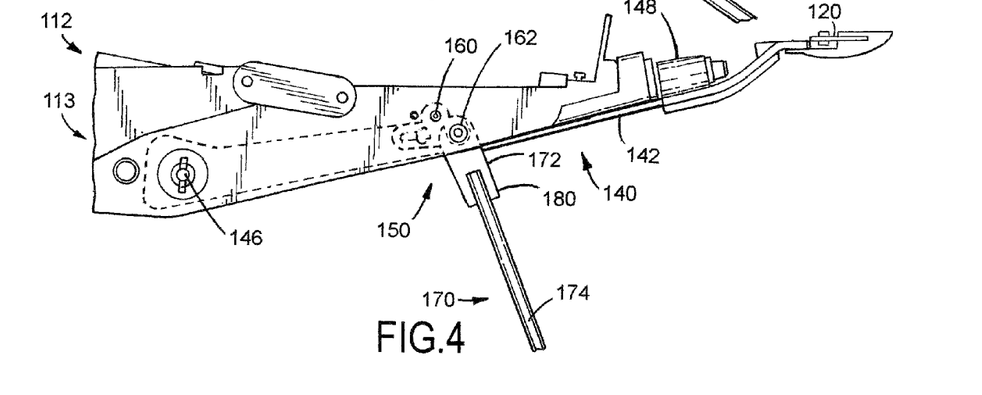
FIG. 4 is a partial side view of the header and the cutterbar lockout tool of FIG. 2 with the cutterbar assembly in a proximal position with respect to the header chassis.

FIGS. 2-4 illustrate partial views of an agricultural harvester header 112 according to the subject application. In particular, header 112 includes a chassis 113 and a cutterbar assembly 140 extending from the chassis. The cutterbar assembly 140 includes a cutterbar 120 and a flex arm or supporting arm 142. The flex arm has one end 144 pivotably connected to the chassis at pivot 146 and an opposite end 148 connected to the cutterbar. Header 112 further includes a down-stop linkage assembly 150 that connects the flex arm 142 to the chassis 113 about a mid-section or mid-region 152 of the flex arm. The down-stop linkage assembly limits downward movement of the flex arm 142, and thus the cutterbar 120, relative to the header chassis 113. The down-stop linkage assembly 150 includes a down-stop linkage 154 formed e.g., as an elongated body or link. The down-stop linkage has one end connected to one of the header chassis 113 and the flex arm 142 and an opposite end pivotably and slidably connected to the other of the header chassis and the flex arm. For example, the elongated body or link 154 has a first end 156 pivotably connected to the chassis 113 at pivot 156a and a slotted second end 158 opposite the first end pivotably and slidably connected to the flex arm 142 via a slot 158a within which is received a boss or stud 158b carried by flex arm 142 for guiding the motion of or camming against the down-stop linkage assembly as the cutterbar assembly moves between the first and second positions, as described below.

The down-stop linkage assembly 150 includes the down-stop linkage 154, a fastener or fastening member 160 (FIG. 4) and an engaging member 162 that can assume a variety of configurations, as described in greater detail below. In the aspect depicted in FIGS. 2-4, the engaging member is constructed as a protrusion 162 (FIG. 3) extending in a direction substantially perpendicular to a longitudinal axis A of the down-stop linkage. By way of further example, referring to FIG. 10, in accordance with another aspect the engaging member is a slotted aperture 509 formed within the body of the down-stop linkage 154.

The fastener 160 is operable to releasably engage the down-stop linkage 154 with the chassis 113. According to an aspect, the fastener 160 may be a lock pin or other member that may be releasably received in alignable and cooperating apertures 166 and 168 (FIG. 2) provided in the down-stop linkage 154 and chassis 113, respectively. Upon alignment of apertures 166, 168, fastener 160 is inserted into the aligned apertures as shown in FIG. 4 to lock the cutterbar assembly with respect to the chassis 113.

Referring again to FIGS. 2-4, the header 112 further includes a lockout tool 170. According to an aspect, the lockout tool includes an engaging portion 172 configured to engage a portion of the down-stop linkage assembly 150 of the cutterbar assembly 140. Specifically, the engaging portion engages the engaging member 162 of the down-stop linkage assembly. The lockout tool additionally includes an elongated body or handle 174 extending from the engaging portion 172 that may be grasped by an operator for applying a torque to the down-stop linkage assembly. The magnitude of torque that can be generated by the elongated body 174 is sufficient to move the cutterbar assembly i.e., raise and lower the cutterbar assembly in relation to the chassis.

FIGS. 2-4 sequentially show lockout tool 170 as it would appear when raising the cutterbar assembly 140 from a first distal position to a second proximal position relative to the header chassis 113. That is, the down-stop linkage assembly 150 is positionable between the first and second positions. In the first position (FIG. 2) the cutterbar 120 is positioned distal to a front end 113a of the chassis 113. In the second position (FIG. 4) the cutterbar is positioned proximal to the front end of the chassis. In an intermediate position (FIG. 3) the cutterbar 120 is positioned intermediate distal and proximal positions relative to the front end 113a of the of the chassis. The down-stop linkage assembly may be repositioned from either the first position or the second position upon application of sufficient force on the lockout tool which is converted into torque at pivot 156a. Upon positioning of the down-stop linkage assembly from the first position to the second position, the cutterbar assembly 140 can be secured in a fixed position relative to the chassis 113 by inserting fastener 160 into the aligned apertures 166, 168. Similarly, when it is desired to release the down-stop linkage assembly from the second position and place it into the first position, torque is again applied to the down-stop linkage assembly via the handle 174, the lock pin is removed from apertures 166, 168 and the cutterbar assembly 140 is permitted to lower under its own weight.

As seen in FIG. 2, the engaging portion 172 of the lockout tool 170 includes a jaw 176 having a throat 178 for receiving the down-stop linkage assembly 150. According to an aspect, the jaw can include a hollow body portion 180 (FIG. 4) including threading, a J-slot or the like for releasably engaging and receiving the elongated body 174.

Figure 5:
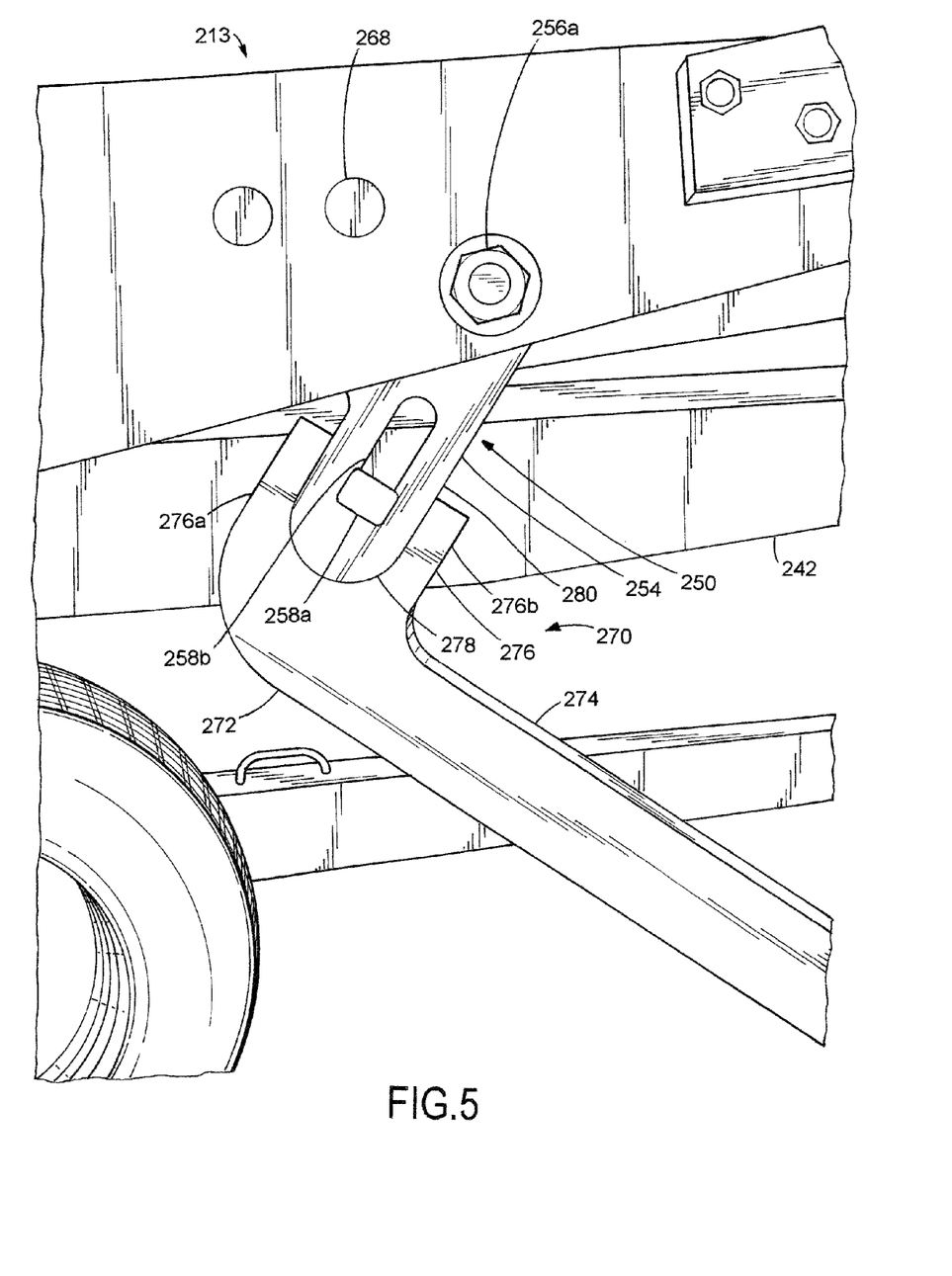
FIG. 5 is a side view of a cutterbar lockout tool according to another aspect of the subject application engaged with a header down-stop linkage assembly.

Referring to FIG. 5, there is shown a further aspect of the lockout tool according to the subject application. The lockout tool, identified as 270, includes an engaging portion 272 and an elongated body or handle 274 extending from the engaging portion. The engaging portion includes a jaw 276 defining a throat 278 for receiving an engaging member of a down-stop linkage assembly 250. In this aspect, the engaging member of the down-stop linkage assembly is the end of the down-stop linkage assembly 250 proximate the supporting arm. That is, the outer profile of the down-stop linkage 254 forms the engaging member which is engaged by the lockout tool. As seen in FIG. 5, the throat 278 of jaw 276 engages the engaging member and force is applied in a clockwise direction (as shown in FIG. 5) or downward direction on the elongated tool body or handle 274 in order to pivot the down-stop linkage 254 about pivot 256a while slidably and pivotably moving the link 254 via interaction of a boss or stud 258a provided on supporting arm 242 within slot 258b of the engaging member. When the down-stop linkage assembly reaches the second or proximal position with respect to the chassis 213, an unillustrated fastener may be inserted in an unillustrated aperture provided in the down-stop linkage 254 and an aperture 268 in chassis 213 similar to the manner described above in connection with FIGS. 2-4 in order to secure the unillustrated cutterbar in the second position.

As depicted in FIG. 5 the jaw 276 of lockout tool 270 is situated at an end of the handle 274 and extends at an angle with respect to the handle. Jaw 276 includes a pair of spaced apart gripping members 276a, 276b which are configured to closely engage upper and lower surfaces or side portions of the down-stop linkage 254. That is, gripping members 276a, 276b are preferably spaced apart a distance just slightly greater than the width of the down-stop linkage 254 between its upper and lower surfaces or side portions in order to minimize the possibility of slippage of the lockout tool 270 from the engaging member during turning of the tool. As illustrated, the end of the down-stop linkage 254 that is engaged by the jaw 276 of lockout tool 270 can be curved in shape. In that event, the throat 278 of jaw 276 can be substantially U-shaped in order to provide a firm and close mating fit between the jaw and the engaging member. It will be understood, however, that the end of the engaging member 280 may assume other shapes such as rectilinear or a combination of curvilinear and rectilinear and that the throat 278 of jaw 276 may be correspondingly shaped in order to substantially matingly receive the engaging member. Further, although shown as extending substantially perpendicular to handle 274, jaw 276 may project at an angle greater than zero degrees, an acute angle or an obtuse angle with respect to the handle.

Figures 6, 7:
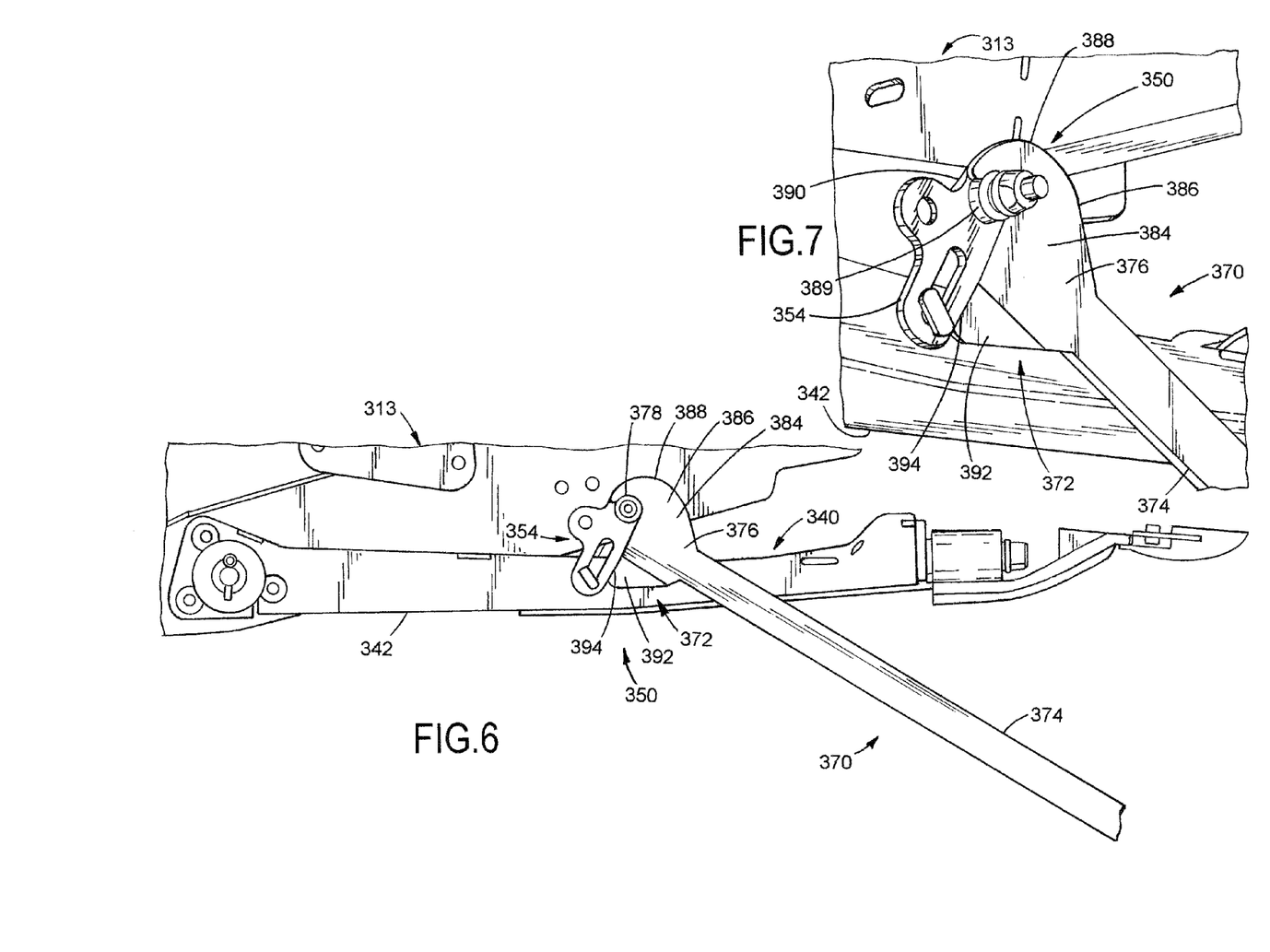
FIG. 6 is a partial side view of a header chassis and a cutterbar lockout tool according to another aspect of the subject application with a cutterbar assembly in a distal position with respect to a header chassis.
FIG. 7 is an enlarged perspective view of the cutterbar lockout tool and down-stop linkage of FIG. 6.

FIGS. 6 and 7 show a down-stop linkage assembly 350 and lockout tool 370 pursuant to a further aspect of the subject application. The down-stop linkage assembly 350 includes a down-stop linkage 354 and an unillustrated fastening member similar to fastening member 160 of FIG. 4. According to this aspect, the lockout tool 370 is configured as shown in FIGS. 6 and 7 and includes a jaw 376 integrally connected to an elongated body or handle 374. The jaw is an elongated jaw defining a plane and having an elongated base 384 for engaging the down-stop linkage assembly 350. Specifically, at least a portion of the elongated base 384 engages a lower side of the down-stop linkage 354. The jaw 376 includes a first end 386 extending from the elongated base in a first direction, which is a direction substantially opposite from the direction the elongated body or handle 374 of the tool 370 extends from the elongated base 384. The first end 386 of the jaw 376 has a curved or crescent shaped portion 388 extending medially i.e., towards a medial plane, of the jaw defining a throat 378 (FIG. 6) for receiving a projection 389 provided at a first end 390 of the down-stop linkage assembly (FIG. 7). As illustrated, the throat 378 has an opening facing a direction perpendicular to a longitudinal axis of the handle 374, i.e., toward a second end 392 of the elongated base (although the throat opening can be disposed at any angle with respect to the longitudinal axis of the handle). Second end 392 extends from the elongated base 384 about an end opposite the first end 386 in a second direction at an angle relative to the elongated base for abutting a lower side 394 of the down-stop linkage 354 of the down-stop linkage assembly 350. Specifically, as best shown in FIG. 7, the second end 392 of the elongated base 384 extends away from the first end 386 and is directed at an angle with respect to the plane of the jaw 376. As shown in FIG. 7, the second end 392 is angled towards the direction of the supporting arm 342 in order to provide an abutment surface for contacting the lower side 394 of the down-stop linkage 354. In the alternative, rather than an angled second end 392, a protrusion may be provided on either the down-stop linkage 354 or the tool 370 to achieve the desired effect. That is, the down-stop linkage may have an outwardly projecting protrusion the underside of which may be engaged by the tool or the tool may have an inwardly projecting protrusion which engages the lower side of the down-stop linkage. In any event, applying force to the handle or elongated body 374 in a manner similar to that shown in FIGS. 2-4 results in a torque being applied to the down-stop linkage 354 that enables the cutterbar assembly 340 to be raised from a first position distal to the chassis 313 to a second position proximal thereto at which point it may be releasably locked.

Figure 8:
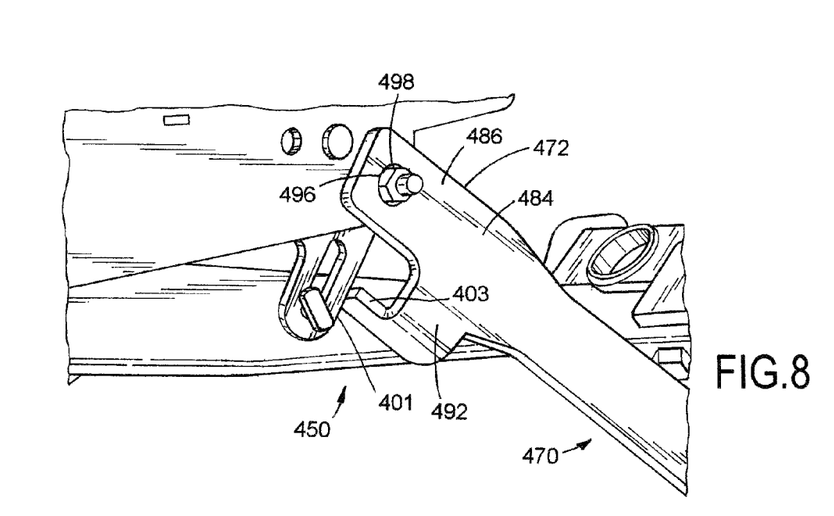
FIG. 8 is a partial side view of a header chassis and a cutterbar lockout tool according to another aspect of the subject application with a cutterbar assembly in a distal position with respect to a header chassis.
Figure 9:
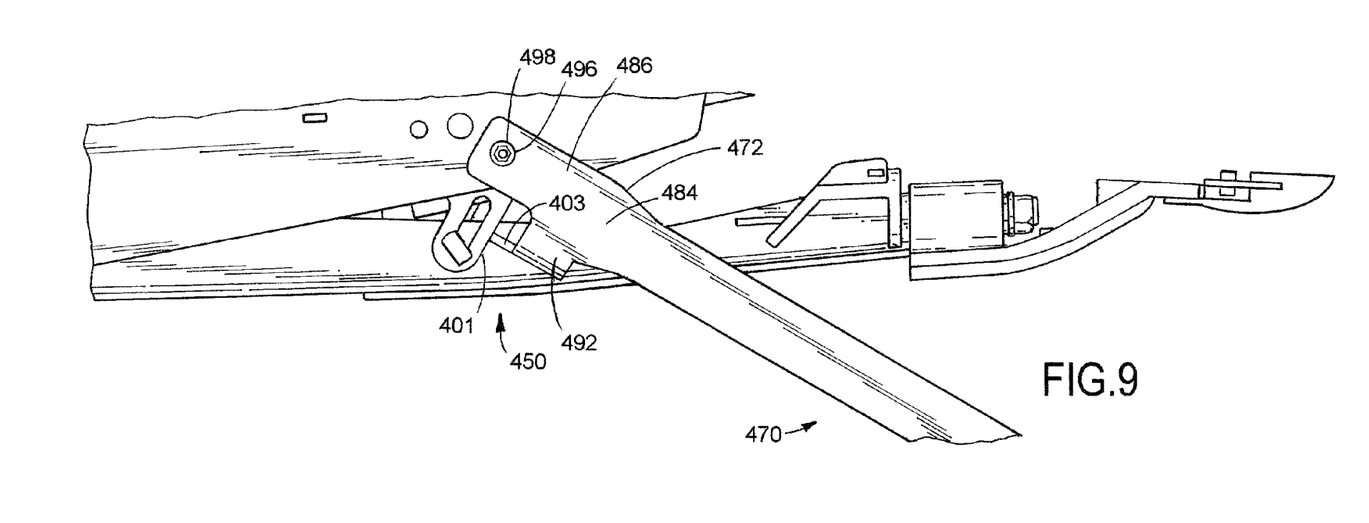
FIG. 9 is an enlarged perspective view of the cutterbar lockout tool and down-stop linkage of FIG. 8.

FIGS. 8 and 9 show a down-stop linkage assembly 450 and lockout tool 470 according to a further aspect of the subject application. According to this aspect, the engaging portion 472 of the lockout tool includes a base 484 and a first end 486 extending from the base. The first end includes an aperture 496 for receiving first portion 498 of the down-stop linkage assembly. The lockout tool engaging portion additionally has a second end 492 extending form the base and configured to abut a second portion 401 of the down-stop linkage assembly spaced from the first portion 498. As seen in FIGS. 8 and 9, the first end 486 extends from the base along a first plane and the second end 492 includes an abutment member 403 extending from the base along a second plane substantially perpendicular from the first plane and configured to abut the second portion 401 of the down-stop linkage assembly. The second end 492 includes a neck that curves about 90° from the first plane of the base such that the abutment member 403 extends substantially perpendicular from the first end 486. The abutment member 403 also extends further upwards from the neck such that a substantially U-shaped aperture is formed between the abutment member 403 and a medial side wall of the first member. The base of the U-shaped aperture is positioned lower on the engaging portion than the aperture 496. Further, the distance between the aperture 496 and the abutment member 403 is sized to be substantially the same as the spacing between the first portion 498 and the bottom surface of the down-stop linkage. Thus in operation, as the lockout tool engages the first portion 498, the abutment member engages a bottom side of the down-stop linkage proximate an end of the down-stop linkage opposite the first portion 498 such that a downward force on the lockout tool produces a torque on the down-stop linkage for raising or lowering the supporting arm.

Figures 10, 11:
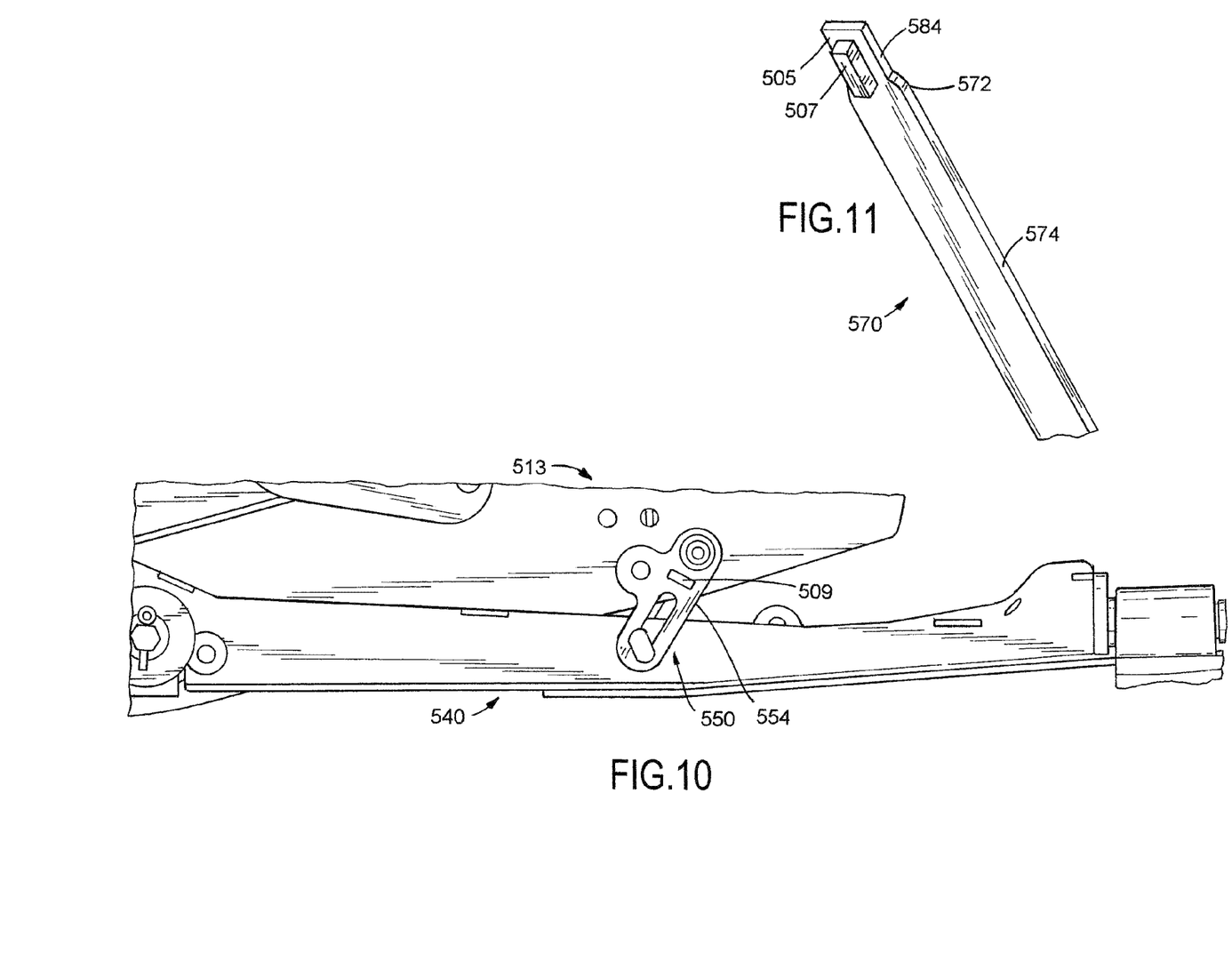
FIG. 10 is a partial side view of a header chassis including a down-stop linkage according an aspect of the subject application with a cutterbar assembly in a distal position with respect to the header chassis.
FIG. 11 is a front perspective view of a cutterbar lockout tool according to another aspect of the subject application for use with the down-stop linkage of FIG. 10.

FIGS. 10 and 11 respectively show a down-stop linkage assembly 550 and lockout tool 570 according to a further aspect of the subject application. As illustrated in FIG. 11, the engaging portion 572 of the lockout tool 570 has a planar base 584 with a first major surface 505. A boss 507 extends or projects from the first major surface. Boss 507 is configured to engage with a correspondingly shaped aperture 509 provided on the down-stop linkage 554 of the down-stop linkage assembly. That is, the boss 507 is inserted into aperture 509 whereby the operator may apply a force to the elongated body or handle portion 574 (FIG. 11) sufficient to apply a torque for turning the down-stop linkage 554 to raise the cutterbar assembly 540 (FIG. 10) from a lowered first position to a raised second position relative to the chassis 513. Although shown as substantially rectangular in shape, it will be understood that the boss 507 and aperture 509 may assume any rectilinear, curvilinear or combination of rectilinear and curvilinear shape other than a circle. In the present example, the boss is a rectangular boss having a longitudinal axis substantially parallel to the longitudinal axis of the handle. It will be further understood that more than one boss may project from the engaging portion of the lockout tool, which bosses would be receivable in a corresponding number of apertures provided on the down-stop linkage. Further, as shown, the aperture 509 is positioned in between a first end of the down-stop linkage pivotably connected to the chassis and a slot of the down-stop linkage pivotably connected to the supporting arm 540. However, the boss-receiving aperture(s) may be located anywhere along the down-stop linkage.

As discussed above, manual lifting and locking of a cutterbar is a labor-intensive and time-consuming task that is often difficult for one person to perform. In this regard, it is often necessary in many headers to apply at least 180 ft-lbs of torque to a supporting arm in order to raise the down-stop linkage assembly a sufficient distance whereby the worker can insert a fastener into the cooperating apertures of the header chassis and the down-stop linkage assembly. This task must be repeated for every supporting arm that is provided on the header. Since typical headers may include as many as 10-16 supporting arms it will be appreciated that positioning and securing the cutterbar into a locked position can be challenging for many workers.

The cooperating lockout tools and down-stop linkage assemblies of the subject application greatly reduce the amount of effort a worker must expend when placing a cutterbar into a locked position relative to a header chassis. That is, the subject lockout tools and down-stop linkage assemblies enable the worker to apply considerable lifting torque at the supporting arm pin through the down-stop linkage assembly as opposed to physically lifting the supporting arm itself. The elongated body or handle portions of the lockout tools are of a manageable length sufficient to produce substantial torque at the down-stop linkage assembly. By way of example but not limitation, the elongated bodies of the lockout tools disclosed herein have lengths that when combined with the motion of the down-stop linkage are desirably sufficient to produce torque of about 200 ft-lbs with the cutterbar down to about 800 ft-lbs with the cutterbar up in order to effectively move the cutterbar assembly. In so doing, a worker can raise a supporting arm with relative ease using one hand while inserting the fastener or lock pin with the other.

Figure 12:
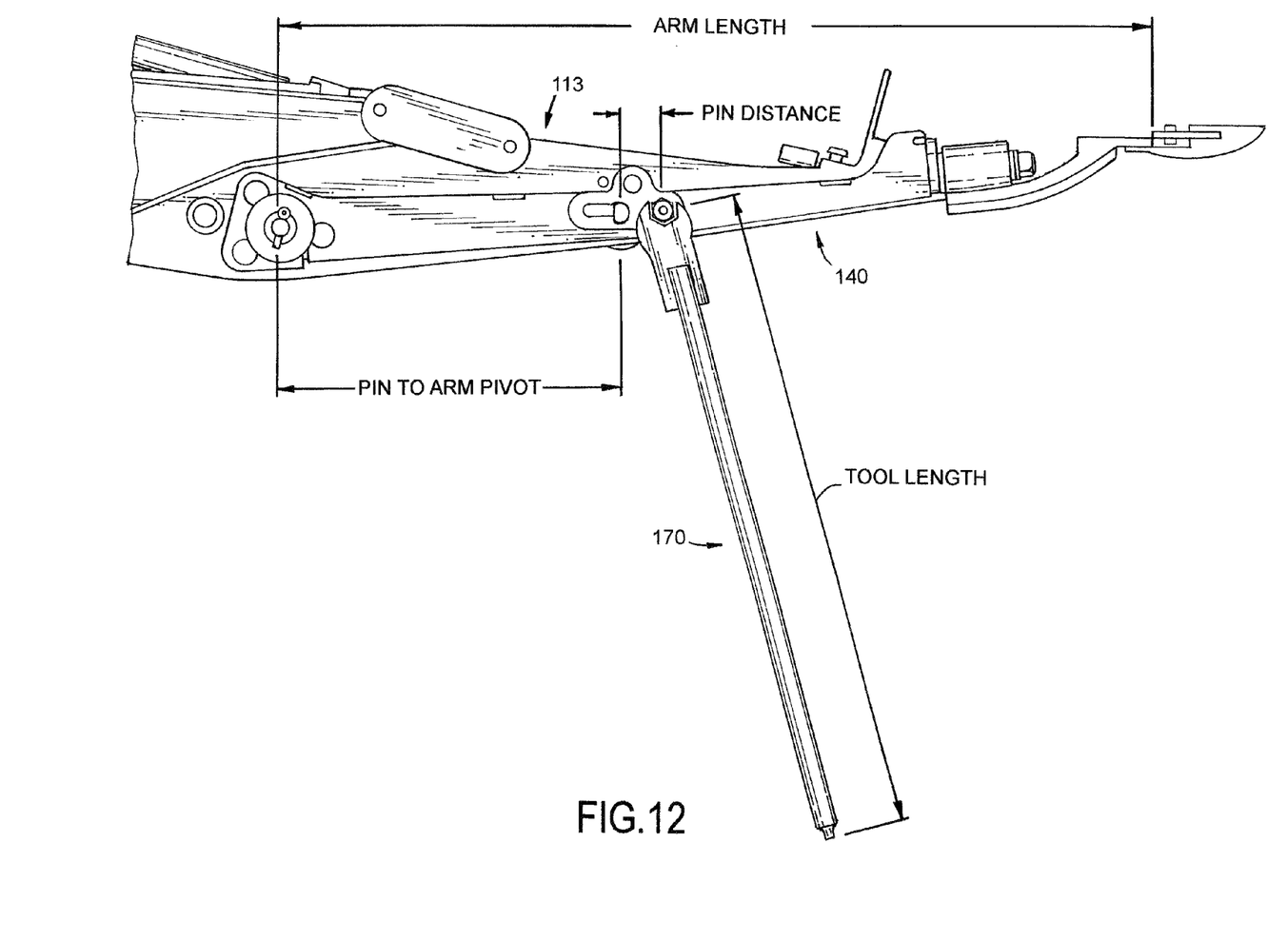
FIG. 12 is a partial side view of a header chassis and a cutterbar lockout tool according to the subject application with a cutterbar assembly in a proximal position with respect to the header chassis.

According to an aspect, the subject application contemplates use of lockout tools that produce considerable mechanical advantage versus conventional manual lifting of the supporting arms. Referring to FIG. 12 there is shown a partial side view of the header chassis 113 and a cutterbar lockout tool 170 of FIGS. 2-4 with the cutterbar assembly 140 in a proximal position with respect to the header chassis and depicting certain dimensional parameters for determining mechanical advantage produced by the lockout tool. According to the subject application, mechanical advantage at the upper lockout position may be calculated as follows:

$$\frac{\text{Tool Length}}{\text{Pin Distance}} \times \frac{\text{Pin to Arm Pivot Distance}}{\text{Arm Length}} : 1$$

In the illustrated but non-limitative example, the tool length is 600 mm (approximately 24 inches), the pin distance is 44 mm, the pin to supporting arm pivot distance is 350 mm and the supporting arm length is 900 mm. The mechanical advantage achieved by the lockout tool having a length of 600 mm on a down-stop linkage and cutterbar assembly as dimensioned above would be calculated as follows: (600/44)(350/900) or approximately 5.3:1. In comparison to conventional tools, e.g., a pry bar, in order to achieve similar mechanical advantage using the pry bar it is estimated that such bar would need to be approximately 15 feet in length, which would necessarily require the assistance of another person to manipulate the pry bar as one worker either inserts or withdraws the lock pins from the down-stop linkages and header chassis. While the foregoing example results in a mechanical advantage of approximately 5.3:1, the present embodiments of the subject application can produce mechanical advantages of at least about 4:1 or greater.

In addition to the header assembly and lockout tools described above, the subject application provides a method for repositioning a cutterbar assembly of a header of an agricultural harvester. According to the method, the header includes a chassis and a cutterbar assembly extending from the chassis. The cutterbar assembly includes a supporting arm having one end pivotably connected to the chassis and an opposite end connected to a cutterbar. The method includes the act of connecting the supporting arm to the chassis about a mid-region of the supporting arm with a down-stop linkage assembly positionable between first and second positions. In the first position the cutterbar is positioned distal to a front end of the chassis and in the second position the cutterbar is positioned proximal to the front end of the chassis. A lockout tool is received by and is engageable with the down-stop linkage assembly for applying a torque to the down-stop linkage assembly. Then, the down-stop linkage assembly is repositioned from either the first position or the second position upon application of the torque.

The method also entails securing the cutterbar assembly into a fixed position relative to the chassis upon repositioning of the down-stop linkage assembly from the first position to the second position by receiving a lock pin in cooperating apertures in the down-stop linkage assembly and the chassis.

The applied torque necessary to raise the cutterbar assembly is about 180 ft-lbs and the act of applying the torque to the down-stop linkage by applying a force on the lockout tool results in a mechanical advantage of at least 4:1. It has been observed that performing such method in respect to agricultural harvesters equipped with down-stop linkages results in a single worker being able to relatively easily and rapidly lock a cutterbar with respect to the header chassis, thereby overcoming the shortcomings of excessive labor and time associated with the conventional practice of manually lifting the supporting arms.

It will be appreciated by those skilled in the art that changes could be made to the aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A method for repositioning a cutterbar assembly of a header of an agricultural harvester, the header comprising a chassis, the cutterbar assembly extending from the chassis, the cutterbar assembly comprising a cutterbar and a supporting arm having one end, an opposite end, and a mid-region, the opposite end connected to the cutterbar, the method comprising steps of:
   connecting the one end of the supporting arm to the chassis;
   connecting the mid-region of the supporting arm to the chassis via a down-stop linkage assembly positionable between first and second positions, wherein in the first position the cutterbar is positioned distal to a front end of the chassis and in the second position the cutterbar is positioned proximal to the front end of the chassis;
   engaging a lockout tool with the down-stop linkage assembly;
   applying a torque to the down-stop linkage assembly via the lockout tool; and
   repositioning the down-stop linkage assembly from either the first position or the second position upon application of the torque.

2. The method of claim 1, further comprising a step of securing the cutterbar assembly into a fixed position relative to the chassis upon repositioning of the down-stop linkage assembly from either the first position or the second position.

3. The method of claim 2, wherein the step of securing further comprises positioning a lock pin in cooperating apertures in the down-stop linkage assembly and the chassis.

4. The method of claim 1, wherein the step of applying the torque to the down-stop linkage assembly via the lockout tool comprises applying a torque of about 200 ft-lbs to about 800 ft-lbs via the lockout tool.

5. The method of claim 1, wherein the step of applying the torque to the down-stop linkage assembly via the lockout tool comprises applying a force on the lockout tool resulting in a mechanical advantage of at least 4:1 for moving the cutterbar assembly.

6. The method of claim 1, wherein the down-stop linkage assembly comprises a link pivotably connectable to one of the chassis and the supporting arm and slidably connected to another of the chassis and the supporting arm, and wherein the step of connecting the mid-region of the supporting arm to the chassis via the down-stop linkage assembly comprises steps of:
   pivotably connecting the link to the one of the chassis and the supporting arm; and slidably connecting the link to the other of the chassis and the supporting arm, whereby the down-stop linkage assembly limits movement of the supporting arm relative to the chassis.

7. The method of claim 1, wherein the lockout tool comprises an engaging portion comprising a jaw having a throat for engaging the down-stop linkage assembly, the step of engaging the lockout tool with the down-stop linkage assembly comprising engaging the jaw of the engaging portion of the lockout tool with the down-stop linkage assembly.

8. The method of claim 7, wherein the jaw is an elongated jaw having:
    an elongated base comprising:
        a first end extending from the elongated base, the first end having a curved portion extending medially of the jaw defining the throat for engaging an end of the down-stop linkage assembly; and
        a second end opposite the first end, the second end extending from the elongated base at an angle relative to the elongated base,
    wherein the step of engaging the lockout tool with the down-stop linkage assembly comprises engaging the throat of the lockout tool with the end of the down-stop linkage assembly.

9. The method of claim 8, wherein the curved portion of the first end extends from the elongated base in a first direction and the second end extends from the elongated base in a second direction.

10. The method of claim 7, wherein the lockout tool further comprises an elongated body, and wherein the engaging portion further includes a hollow body portion for releasably engaging and receiving the elongated body.

11. The method of claim 1, wherein the down-stop linkage assembly comprises an aperture, and the lockout tool comprises an engaging portion comprising a planar base and a boss extending from a first major surface of the planar base for engaging the aperture of the down-stop linkage assembly.

12. A method for repositioning a cutterbar assembly of a header of an agricultural harvester, the header comprising a chassis, the cutterbar assembly extending from the chassis, the cutterbar assembly comprising a cutterbar and a supporting arm having a first end and a second end, the second end connected to the cutterbar, the method comprising steps of:
    connecting the first end of the supporting arm to the chassis;
    connecting the supporting arm to the chassis via a down-stop linkage assembly having a first end and a second end by pivotally connecting the first end of the down-stop linkage assembly to one of the supporting arm and the chassis and pivotally and slidably connecting the second end of the down-stop linkage assembly to another one of the supporting arm and the chassis, wherein the down-stop linkage assembly is positionable between first and second positions, and wherein in the first position the cutterbar is positioned distal to a front end of the chassis and in the second position the cutterbar is positioned proximal to the front end of the chassis;
    engaging a lockout tool with the down-stop linkage assembly;
    applying a torque to the down-stop linkage assembly via the lockout tool; and
    repositioning the down-stop linkage assembly from either the first position or the second position upon application of the torque.

13. The method of claim 12, further comprising a step of securing the cutterbar assembly into a fixed position relative to the chassis upon repositioning of the down-stop linkage assembly from either the first position or the second position.

14. The method of claim 13, wherein the step of securing further comprises positioning a lock pin in cooperating apertures in the down-stop linkage assembly and the chassis.

15. The method of claim 12, wherein the lockout tool comprises an engaging portion comprising a jaw having a throat for engaging the down-stop linkage assembly, the step of engaging the lockout tool with the down-stop linkage assembly comprising engaging the jaw of the engaging portion of the lockout tool with the down-stop linkage assembly.

16. The method of claim 15, wherein the jaw is an elongated jaw having:
    an elongated base comprising:
        a first end extending from the elongated base, the first end having a curved portion extending medially of the jaw defining the throat for engaging an end of the down-stop linkage assembly; and
        a second end opposite the first end, the second end extending from the elongated base at an angle relative to the elongated base,
    wherein the step of engaging the lockout tool with the down-stop linkage assembly comprises engaging the throat of the lockout tool with the end of the down-stop linkage assembly.

17. The method of claim 16, wherein the curved portion of the first end extends from the elongated base in a first direction and the second end extends from the elongated base in a second direction.

18. The method of claim 12, wherein the down-stop linkage assembly comprises a down-stop linkage comprising a slot, and wherein the pivotally and slidably connecting the second end of the down-stop linkage assembly to the other one of the supporting arm and the chassis comprises pivotally and slidably connecting the slot of the down-stop linkage to the other one of the supporting arm and the chassis.

19. The method of claim 18, wherein the supporting arm comprises a boss and the pivotally and slidably connecting the slot of the down-stop linkage to the other one of the supporting arm and the chassis comprises pivotally and slidably connecting the slot of the down-stop linkage to the boss of the supporting arm.

20. A method for repositioning a cutterbar assembly of a header of an agricultural harvester, the header comprising a chassis, the cutterbar assembly extending from the chassis, the cutterbar assembly comprising a cutterbar and a supporting arm having a first end and a second end, the second end connected to the cutterbar, the method comprising steps of:
    connecting the first end of the supporting arm to the chassis;
    connecting the supporting arm to the chassis via a down-stop linkage assembly having a first end and a second end by pivotally connecting the first end of the down-stop linkage assembly to the chassis and pivotally and slidably connecting the second end of the down-stop linkage assembly to the supporting arm, wherein the down-stop linkage assembly is positionable between first and second positions, and wherein in the first position the cutterbar is positioned distal to a front end of the chassis and in the second position the cutterbar is positioned proximal to the front end of the chassis;
engaging a lockout tool with the down-stop linkage assembly;
applying a torque to the down-stop linkage assembly via the lockout tool; and
repositioning the down-stop linkage assembly from either the first position or the second position upon application of the torque.

* * * * *